United States Patent
Gafni

(10) Patent No.: US 10,084,716 B2
(45) Date of Patent: Sep. 25, 2018

(54) FLEXIBLE APPLICATION OF CONGESTION CONTROL MEASURES

(71) Applicant: Mellanox Technologies TLV Ltd., Raanana (IL)

(72) Inventor: Barak Gafni, Kfar Malal (IL)

(73) Assignee: MELLANOX TECHNOLOGIES TLV LTD., Raanana (IL)

(*) Notice: Subject to any disclaimer, the term of this patent is extended or adjusted under 35 U.S.C. 154(b) by 48 days.

(21) Appl. No.: 15/075,158

(22) Filed: Mar. 20, 2016

(65) Prior Publication Data

US 2017/0272372 A1    Sep. 21, 2017

(51) Int. Cl.
*H04L 12/26*    (2006.01)
*H04L 12/823*   (2013.01)
*H04L 12/833*   (2013.01)

(52) U.S. Cl.
CPC .............. *H04L 47/32* (2013.01); *H04L 47/31* (2013.01)

(58) Field of Classification Search
None
See application file for complete search history.

(56) References Cited

U.S. PATENT DOCUMENTS

| | | |
|---|---|---|
| 6,108,713 A | 8/2000 | Sambamurthy et al. |
| 6,178,448 B1 | 1/2001 | Gray et al. |
| 6,594,263 B1 | 7/2003 | Martinsson et al. |
| 7,321,553 B2 | 1/2008 | Prasad et al. |
| 7,821,939 B2 | 10/2010 | Decusatis et al. |
| 8,078,743 B2 | 12/2011 | Sharp et al. |
| 8,345,548 B2 | 1/2013 | Gusat et al. |
| 8,473,693 B1 | 6/2013 | Muppalaneni et al. |
| 8,576,715 B2 | 11/2013 | Bloch et al. |
| 8,767,561 B2 | 7/2014 | Gnanasekaran et al. |
| 8,811,183 B1 | 8/2014 | Anand et al. |

(Continued)

FOREIGN PATENT DOCUMENTS

| | | |
|---|---|---|
| EP | 1720295 A1 | 11/2006 |
| EP | 2466476 A1 | 6/2012 |

(Continued)

OTHER PUBLICATIONS

CISCO Systems, Inc., "Priority Flow Control: Build Reliable Layer 2 Infrastructure", 8 pages, 2015.

(Continued)

*Primary Examiner* — Jay P Patel

(74) *Attorney, Agent, or Firm* — D.Kligler IP Services Ltd.

(57) ABSTRACT

Communication apparatus includes multiple interfaces configured to be connected to a packet data network and a memory, coupled to the interfaces and configured as a buffer to contain the data packets received through the ingress interfaces in multiple queues while awaiting transmission to the network via the egress interfaces. Congestion control logic includes a packet discard machine, which is configured to drop a first fraction of the data packets from at least a first queue in the buffer in response to a status of the queues, and a packet marking machine, which is configured to apply a congestion notification to a second fraction of the data packets from at least a second queue in the buffer in response to the status of the queues. Machine control circuitry is coupled to selectively enable and disable at least the packet discard machine.

16 Claims, 2 Drawing Sheets

(56) References Cited

U.S. PATENT DOCUMENTS

| | | | |
|---|---|---|---|
| 8,879,396 | B2 | 11/2014 | Guay et al. |
| 8,989,017 | B2 | 3/2015 | Naouri et al. |
| 8,995,265 | B2 | 3/2015 | Basso et al. |
| 9,014,006 | B2 | 4/2015 | Haramaty et al. |
| 9,325,619 | B2 | 4/2016 | Guay et al. |
| 9,356,868 | B2 | 5/2016 | Tabatabaee et al. |
| 9,426,085 | B1 | 8/2016 | Anand et al. |
| 2002/0191559 | A1 | 12/2002 | Chen et al. |
| 2003/0108010 | A1 | 6/2003 | Kim et al. |
| 2003/0223368 | A1* | 12/2003 | Allen, Jr. ............... H04L 47/12 370/235 |
| 2004/0008714 | A1 | 1/2004 | Jones |
| 2005/0053077 | A1 | 3/2005 | Blanc et al. |
| 2005/0169172 | A1 | 8/2005 | Wang et al. |
| 2005/0216822 | A1 | 9/2005 | Kyusojin et al. |
| 2005/0226156 | A1 | 10/2005 | Keating et al. |
| 2005/0228900 | A1 | 10/2005 | Stuart et al. |
| 2006/0088036 | A1 | 4/2006 | De Prezzo |
| 2006/0092837 | A1 | 5/2006 | Kwan et al. |
| 2006/0092845 | A1 | 5/2006 | Kwan et al. |
| 2007/0097257 | A1 | 5/2007 | El-Maleh et al. |
| 2007/0104102 | A1 | 5/2007 | Opsasnick |
| 2007/0104211 | A1 | 5/2007 | Opsasnick |
| 2007/0201499 | A1* | 8/2007 | Kapoor ................. H04L 47/10 370/412 |
| 2007/0291644 | A1 | 12/2007 | Roberts et al. |
| 2008/0037420 | A1 | 2/2008 | Tang et al. |
| 2008/0175146 | A1 | 7/2008 | Van Leekwuck et al. |
| 2008/0192764 | A1 | 8/2008 | Arefi et al. |
| 2009/0207848 | A1 | 8/2009 | Kwan et al. |
| 2010/0220742 | A1 | 9/2010 | Brewer et al. |
| 2013/0014118 | A1 | 1/2013 | Jones |
| 2013/0039178 | A1 | 2/2013 | Chen et al. |
| 2013/0250757 | A1 | 9/2013 | Tabatabaee et al. |
| 2013/0250762 | A1 | 9/2013 | Assarpour |
| 2013/0275631 | A1 | 10/2013 | Magro et al. |
| 2013/0286834 | A1 | 10/2013 | Lee |
| 2013/0305250 | A1 | 11/2013 | Durant |
| 2014/0133314 | A1 | 5/2014 | Mathews et al. |
| 2014/0269324 | A1 | 9/2014 | Tietz et al. |
| 2015/0026361 | A1 | 1/2015 | Matthews et al. |
| 2015/0124611 | A1 | 5/2015 | Attar et al. |
| 2015/0127797 | A1 | 5/2015 | Attar et al. |
| 2015/0180782 | A1 | 6/2015 | Rimmer et al. |
| 2015/0200866 | A1 | 7/2015 | Pope et al. |
| 2015/0381505 | A1* | 12/2015 | Sundararaman ........ H04L 47/25 370/235 |
| 2016/0135076 | A1 | 5/2016 | Grinshpun et al. |
| 2017/0118108 | A1 | 4/2017 | Avci et al. |
| 2017/0142020 | A1* | 5/2017 | Sundararaman ........ H04L 47/25 |
| 2017/0180261 | A1 | 6/2017 | Ma et al. |
| 2017/0187641 | A1* | 6/2017 | Lundqvist ........... H04L 43/0888 |

FOREIGN PATENT DOCUMENTS

| | | |
|---|---|---|
| WO | 2009107089 A2 | 9/2009 |
| WO | 2013136355 A1 | 9/2013 |
| WO | 2013180691 A1 | 12/2013 |

OTHER PUBLICATIONS

CISCO Systems, Inc.,"Advantage Series White Paper Smart Buffering", 10 pages, 2016.
Hoeiland-Joergensen et al., "The FlowQueue-CoDel Packet Scheduler and Active Queue Management Algorithm", Internet Engineering Task Force (IETF) as draft-ietf-aqm-fq-codel-06 , 23 pages, Mar. 18, 2016.
U.S. Appl. No. 14/718,114 Office Action dated Sep. 16, 2016.
U.S. Appl. No. 14/672,357 Office Action dated Sep. 28, 2016.
Gran et al., "Congestion Management in Lossless Interconnection Networks", Submitted to the Faculty of Mathematics and Natural Sciences at the University of Oslo in partial fulfillment of the requirements for the degree Philosophiae Doctor, 156 pages, Sep. 2013.
Pfister et al., "Hot Spot Contention and Combining in Multistage Interconnect Networks", IEEE Transactions on Computers, vol. C-34, pp. 943-948, Oct. 1985.
Zhu et al., "Congestion control for large-scale RDMA deployments", SIGCOMM'15, pp. 523-536, Aug. 17-21, 2015.
Hahne et al., "Dynamic Queue Length Thresholds for Multiple Loss Priorities", IEEE/ACM Transactions on Networking, vol. 10, No. 3, pp. 368-380, Jun. 2002.
Choudhury et al., "Dynamic Queue Length Thresholds for Shared-Memory Packet Switches", IEEE/ACM Transactions Networking, vol. 6, Issue 2 , pp. 130-140, Apr. 1998.
Gafni et al., U.S. Appl. No. 14/672,357, filed Mar. 30, 3015.
Ramakrishnan et al., "The Addition of Explicit Congestion Notification (ECN) to IP", Request for Comments 3168, Network Working Group, 63 pages, Sep. 2001.
IEEE Standard 802.1Q™-2005, "IEEE Standard for Local and metropolitan area networks Virtual Bridged Local Area Networks", 303 pages, May 19, 2006.
Infiniband TM Architecture, Specification vol. 1, Release 1.2.1, Chapter 12, pp. 657-716, Nov. 2007.
IEEE Std 802.3, Standard for Information Technology—Telecommunications and information exchange between systems—Local and metropolitan area networks—Specific requirements; Part 3: Carrier Sense Multiple Access with Collision Detection (CSMA/CD) Access Method and Physical Layer Specifications Corrigendum 1: Timing Considerations for PAUSE Operations, Annex 31B (MAC Control PAUSE operation), pp. 763-772, year 2005.
IEEE Std 802.1Qbb., IEEE Standard for Local and metropolitan area networks—"Media Access Control (MAC) Bridges and Virtual Bridged Local Area Networks—Amendment 17: Priority-based Flow Control", 40 pages, Sep. 30, 2011.
Elias et al., U.S. Appl. No. 14/718,114, filed May 21, 2015.
Elias et al., U.S. Appl. No. 14/994,164, filed Jan. 13, 2016.
Shipner et al., U.S. Appl. No. 14/967,403, filed Dec. 14, 2015.
U.S. Appl. No. 14/994,164, office action dated Jul. 5, 2017.
U.S. Appl. No. 14/967,403 office action dated Nov. 9, 2017.
U.S. Appl. No. 15/081,969 office action dated Oct. 5, 2017.
European Application # 17172494.1 search report dated Oct. 13, 2017.
European Application # 17178355 search report dated Nov. 13, 2017.
U.S. Appl. No. 15/063,527 office action dated Feb. 8, 2018.
U.S. Appl. No. 15/161,316 office action dated Feb. 7, 2018.
U.S. Appl. No. 15/081,969 office action dated May 17, 2018.
U.S. Appl. No. 15/432,962 office action dated Apr. 26, 2018.
U.S. Appl. No. 15/161,316 Office Action dated Jul. 20, 2018.

* cited by examiner

FLEXIBLE APPLICATION OF CONGESTION CONTROL MEASURES

FIELD OF THE INVENTION

The present invention relates generally to packet communication networks, and particularly to methods and systems for control of congestion in such networks.

BACKGROUND

Network congestion occurs when a link or node in the network is required to carry more data traffic than it is capable of transmitting or forwarding, with the result that its quality of service deteriorates. Typical effects of congestion include queuing delay, packet loss, and blocking of new connections. Modern packet networks use congestion control (including congestion avoidance) techniques in efforts to mitigate congestion before catastrophic results set in.

A number of congestion avoidance techniques are known in the art. In random early detection (RED, also known as random early discard or random early drop), for example, network nodes, such as switches, monitor their average queue size and drop packets based on statistical probabilities: If a given queue (or set of queues) is almost empty, all incoming packets are accepted. As the queue grows, the probability of dropping an incoming packet grows accordingly, reaching 100% when the buffer fill level passes the applicable threshold. Weighted RED (WRED) works in a similar fashion, except that different traffic classes are assigned different congestion avoidance thresholds, so that for a given queue length, low-priority packets have a greater probability of being dropped than high-priority packets. Congestion control techniques of this sort, which operate on a fraction of packets that is determined by statistical probabilities, are referred to herein as statistical congestion control techniques.

Another congestion avoidance technique is Explicit Congestion Notification (ECN), which is an extension to the Internet Protocol (IP) and the Transmission Control Protocol (TCP). ECN was initially defined by Ramakrishnan, et al., in "The Addition of Explicit Congestion Notification (ECN) to IP," which was published as Request for Comments (RFC) 3168 of the Internet Engineering Task Force (2001) and is incorporated herein by reference. ECN provides end-to-end notification of network congestion by signaling impending congestion in the IP header of transmitted packets. The receiver of an ECN-marked packet of this sort echoes the congestion indication to the sender, which reduces its transmission rate as though it had detected a dropped packet. ECN functionality has recently been extended to other transport and tunneling protocols.

SUMMARY

Embodiments of the present invention that are described hereinbelow provide improved methods for congestion control in a network and apparatus implementing such methods.

There is therefore provided, in accordance with an embodiment of the invention, communication apparatus, including multiple interfaces configured to be connected to a packet data network so as to serve as both ingress and egress interfaces in receiving and forwarding of data packets from and to the network by the apparatus. A memory is coupled to the interfaces and configured as a buffer to contain the data packets received through the ingress interfaces in multiple queues while awaiting transmission to the network via the egress interfaces. Congestion control logic includes a packet discard machine, which is configured to drop a first fraction of the data packets from at least a first queue in the buffer in response to a status of the queues, and a packet marking machine, which is configured to apply a congestion notification to a second fraction of the data packets from at least a second queue in the buffer in response to the status of the queues. Machine control circuitry is coupled to selectively enable and disable at least the packet discard machine.

In some embodiments, the machine control circuitry is further coupled to selectively enable and disable the packet marking machine.

In a disclosed embodiment, the packet discard machine and the packet marking machine are configured to drop and apply the congestion notification to respective fractions of the data packets in a same one or more of the queues.

In some embodiments, the congestion notification includes setting an explicit congestion notification (ECN) or a traffic class (TC) field in a header of the data packets.

In the disclosed embodiments, the congestion control logic includes a profile calculator, which is configured to compute the first and second fractions responsively to respective statuses of the first and second queues. Typically, the profile calculator is configured to compute the first and second fractions by comparing lengths of the queues to respective buffer allocations of the queues in the memory, and/or based on respective transmission rates of the queues. Additionally or alternatively, the apparatus includes packet classification logic, which is configured to assign the data packets received through the ingress to the multiple queues, and to convey information regarding the received data packets to the profile calculator.

There is also provided, in accordance with an embodiment of the invention, a method for communication, which includes, in a network element having multiple interfaces connected to a packet data network so as to serve as both ingress and egress interfaces and a memory coupled to the interfaces, placing data packets received through the ingress interfaces in multiple queues in the memory while the data packets await transmission to the network. Congestion control is applied to the data packets that are queued for transmission using a packet discard machine, which is configured to drop a first fraction of the data packets from at least a first queue in the buffer in response to a status of the queues, and using a packet marking machine, which is configured to apply a congestion notification to a second fraction of the data packets from at least a second queue in the buffer in response to the status of the queues. At least the packet discard machine is selectively enabled and disabled, so that when the packet discard machine is disabled, the data packets are not dropped by the network element in response to congestion indicated by the status of the queues.

The present invention will be more fully understood from the following detailed description of the embodiments thereof, taken together with the drawings in which:

DETAILED DESCRIPTION OF EMBODIMENTS

In network elements, such as switches, that are known in the art, packet marking by ECN operates in conjunction with packet discard by RED (including WRED), under the control of a single logical congestion avoidance machine in accordance with the model defined in the above-mentioned RFC 3168. Therefore, ECN packet marking cannot be enabled for applicable packets without also allowing the congestion avoidance machine to drop packets that are not subject to ECN marking when congestion is severe. Conversely, when it is necessary to avoid dropping packets of a certain type, such as TCP control packets (for example, SYN and SYN/ACK packets) or other lossless traffic classes, marking of packets for purposes of congestion avoidance is also disabled.

Embodiments of the present invention that are described herein provide a more flexible model for congestion avoidance, in which the packet discard and packet marking mechanisms are applied separately and independently. In the disclosed embodiments, congestion control logic in communication apparatus, such as a network switch, comprises both a packet discard machine and a packet marking machine. (The term "machine," as used in the present description and in the claims, refers to a distinct logic circuit that performs a certain, well-defined task.) Machine control circuitry in the apparatus is coupled to selectively enable and disable at least the packet discard machine, and possibly the packet marking machine, as well.

This separation of the packet discard and marking machines enables the system operator to configure the apparatus for different sorts of congestion responses: mark only, drop only, or both mark and drop appropriate fractions of the packets in case of congestion. Furthermore, the machine control circuitry can set the packet discard and marking machines to apply different congestion responses to different queues, as well as to different types of traffic, so that TCP control packets, for example, are marked (but not dropped) in case of congestion, while other sorts of packets may be dropped. Separation of the packet discard and marking machines can also enhance the efficiency of congestion control, since packet discard can be applied, for example, early in the processing pipeline of a network switch in order to free buffer space promptly, while packet marking can be applied late in the processing pipeline to enable rapid response to changes in congestion level.

Figure 1:
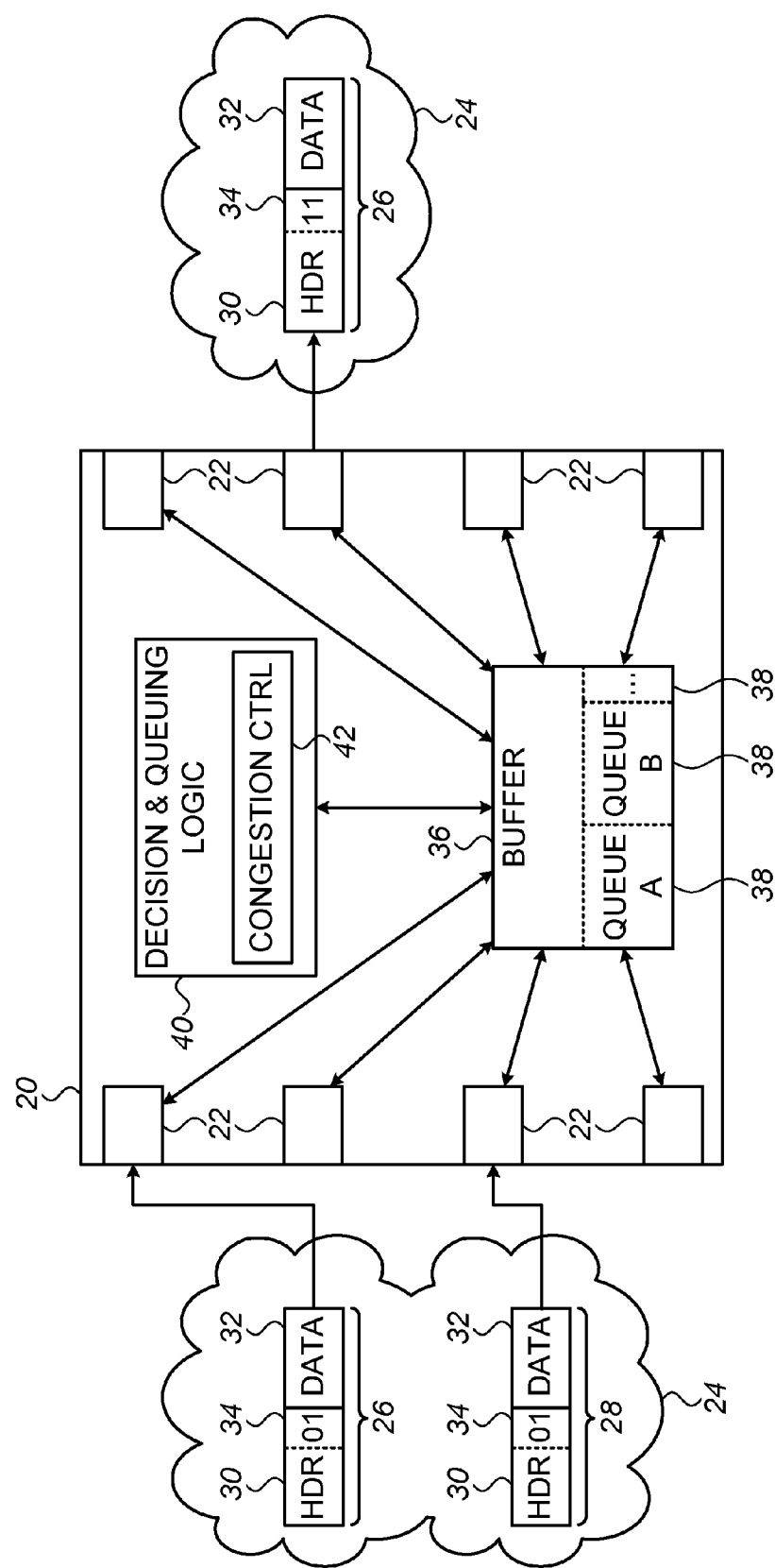
FIG. 1 is a block diagram that schematically illustrates a switch with congestion control capabilities, in accordance with an embodiment of the invention.

FIG. 1 is a block diagram that schematically illustrates a network switch 20 with congestion control capabilities, in accordance with an embodiment of the invention. Switch 20 comprises multiple interfaces 22, such as switch ports, which are connected to a packet data network 24 and are configured to serve as both ingress and egress interfaces in receiving and forwarding of data packets 26, 28, . . . , from and to the network. A memory 36, coupled to interfaces 22, serves as a buffer to receive packets from the ingress interfaces and hold the packets in multiple queues while awaiting transmission to network 24 via the egress interfaces. In the pictured example, memory 36 is configured as a shared buffer, in which each queue receives a respective allocation 38. Alternatively, the principles of the present invention may equally be applied in network elements in which different interfaces have their own, separate buffers, or in which other buffering schemes are used, such as sharing between a portion of the ingress or egress ports, in addition to or instead of the shared buffer shown in FIG. 1.

Allocations 38 (i.e., the amount of buffer that the queue is permitted to use, or equivalently, the control threshold for purposes of congestion control) may be static, or they may vary over time. Furthermore, different queues may receive respective allocations 38 of different sizes, depending, for example, on traffic priority levels or other system considerations. Multiple different queues directed to the same egress interface may receive their own, separate allocations 38. Alternatively or additionally, a memory allocation may be shared among multiple queues that are directed to the same egress interface or even to multiple different egress interfaces. Various sorts of dynamic buffer allocations can be handled by decision and queuing logic 40 in switch 20 and will have an impact on the thresholds applied by congestion control logic 42 in the switch, but these buffer allocation mechanisms themselves are beyond the scope of the present description. Buffer allocation mechanisms that can be used in this context are described, for example, in U.S. patent application Ser. No. 14/672,357, filed Mar. 30, 2015, whose disclosure is incorporated herein by reference.

Congestion control logic 42 in this example applies congestion control, such as ECN and/or WRED, based on statistical or other congestion control criteria, to a respective fraction of the packets that are queued for transmission to network 24 from each queue in memory 36. Logic 42 typically sets the fraction of the packets to be marked or dropped in this context for each queue at any given time based on a relation between the length of the queue and the size of the respective allocation 38. Thus, in response to the status of the queues and depending upon congestion conditions, congestion control logic 42 can drop a certain fraction of the data packets from a certain queue or set of queues in the buffer, while applying a congestion notification marking to another fraction of the data packets from another queue or set of queues. These two sets of queues may intersect, meaning that in some or all of the queues, some packets may be dropped while others are marked with a congestion notification.

In the example shown in FIG. 1, packets 26, 28, . . . , that are received in switch 20 from network 24 include a header 30 and payload data 32, as is known in the art. Headers 30 in this example are assumed to be IP headers, and thus contain an ECN field 34, as specified in RFC 3168. Decision and queuing logic 40 places packets 26 and 28 in respective queues in memory 36, both of which are assumed to be congested in this example. Based on buffer fill levels and machine control settings, congestion control logic 42 drops packet 28 and marks packet 26 by setting ECN field 34 to the value "11" to indicate congestion when switch 20 forwards this packet to network 24.

Although the present description relates, for the sake of concreteness and clarity, to the specific switch 20 that is shown in FIG. 1, the principles of the present invention may similarly be applied, mutatis mutandis, to any network element that implements the sorts of congestion control techniques that are described herein. Thus, in alternative embodiments, these principles may be applied not only in different types of switching apparatus, such as routers and bridges, but also, for example, in advanced network interface controllers that connect a host computer to a network. Furthermore, although the present embodiments relate particularly to congestion control in IP networks and make use of techniques, such as ECN, that have been defined specifically for such networks, the principles of the present invention may alternatively be applied in other sorts of networks and under different protocols to which statistical (or possibly non-statistical) congestion control is relevant, such as MPLS, InfiniBand, and Ethernet.

Figure 2:
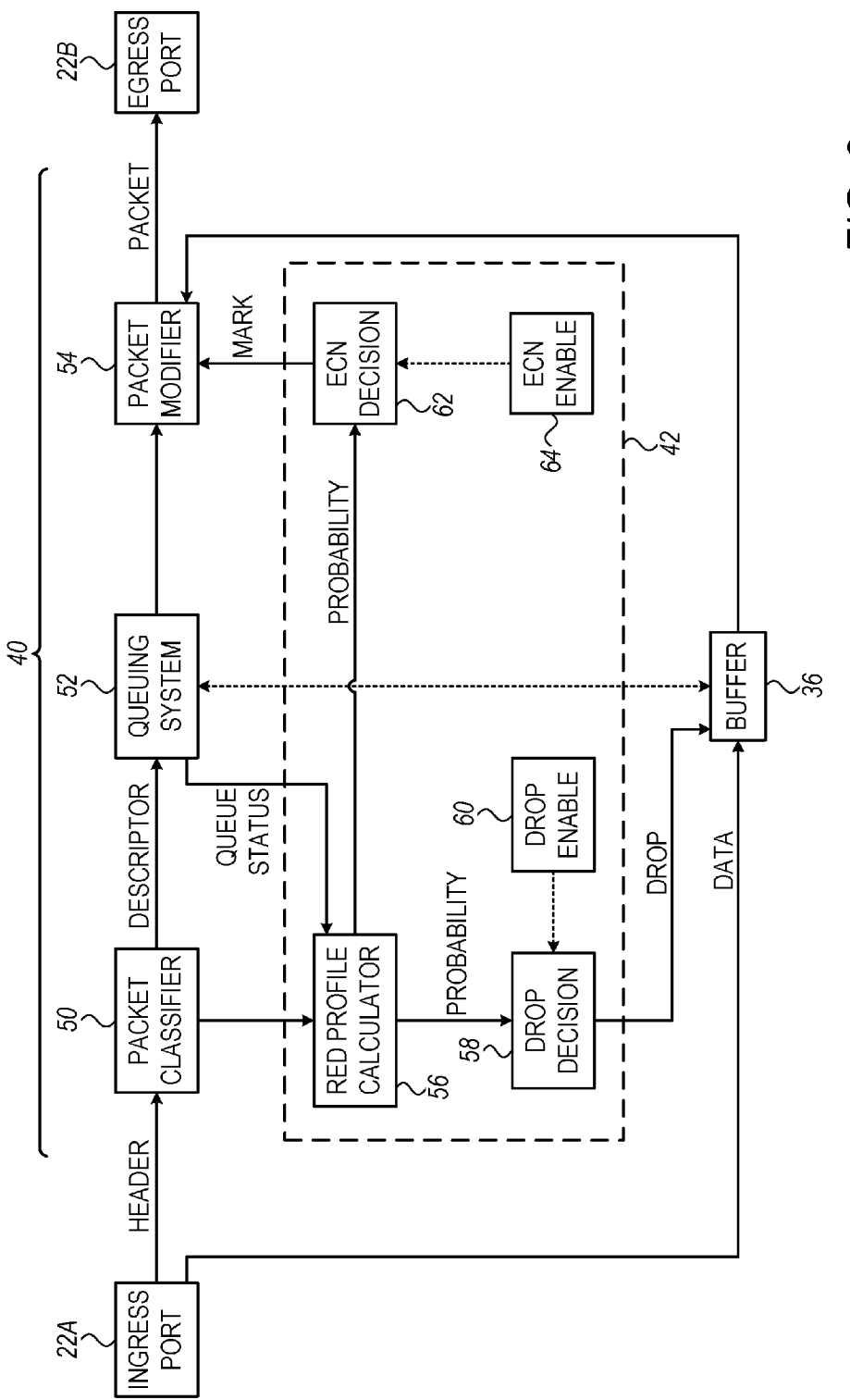
FIG. 2 is a block diagram that schematically shows details of packet processing logic in a switch, in accordance with an embodiment of the invention.

FIG. 2 is a block diagram that schematically shows details of the packet processing logic in switch 20, in accordance with an embodiment of the invention. For the sake of clarity and concreteness, this figure shows one possible implementation of decision and queuing logic 40, including congestion control logic 42, but other implementations will be apparent to those skilled in the art after reading the present description and are considered to be within the scope of the present invention. Although the elements of logic 40 and 42 are shown in FIG. 2 as separate functional components, in practice these components can be implemented together in custom or programmable hardware logic within a single chip or chip set.

Upon receiving an incoming packet, an ingress port 22A (such as one of ports 22 in FIG. 1) places the packet payload in a buffer in memory 36 and notifies decision and queuing logic 40 that the packet is ready for processing. A packet classifier 50 parses the packet header and generates one or more descriptors, which determine an egress port 22B (or ports) through which the packet is to be transmitted and the queue in which the packet is to be placed while awaiting transmission. The descriptor may also indicate the quality of service (QoS) to be applied to the packet, i.e., the level of priority for transmission, and any applicable instructions for modification of the packet header. Packet classifier 50 places the descriptors in the appropriate queues in a queuing system 52, to await transmission via the designated egress ports. As noted earlier, queuing system 52 typically contains a dedicated queue for each egress port 22B or multiple queues per egress port, one for each QoS level.

When a descriptor reaches the head of its queue, queuing system 52 passes the descriptor to a packet modifier 54 for execution. In response to the descriptor, packet modifier 54 reads the appropriate packet data from memory 36, and makes whatever changes are called for in the packet header for transmission to network 24 through egress port 22B. These changes may include marking the packet header, for example by setting ECN field 34 as a congestion notification, in response to instructions from congestion control logic 42.

Congestion control logic 42 comprises a profile calculator 56, which computes congestion control probabilities for each queue to which an incoming packet may be assigned. These probabilities are expressed as fractions, which are input from profile calculator 56 to a packet discard machine 58 and a packet marking machine 62 for purposes of the drop and ECN decisions that are to be made in case of congestion. In other words, for any given queue at any given time, the probability value provided by profile calculator 56 to packet discard machine 58 indicates the fraction of the packets in the queue that are to be dropped; while the probability value provided to packet marking machine 62 (which may be the same as or different from that provided to the packet discard machine) indicates the fraction of the packets in the queue that are to be marked with a congestion notification.

Profile calculator 56 computes and updates these probability values based on queue status information provided by queuing system 52, as well as packet header information analyzed by packet classifier 50. For example, the packet classifier may refer for this purpose to the IP and transport header fields indicating the traffic class and congestion status. As another example, when MPLS is in use, the packet classifier can use the corresponding fields in the MPLS header (as provided by IETF RFC 5129, entitled "Explicit Congestion Marking in MPLS," by Davie et al.), and particularly the QoS and congestion notification information in the MPLS Traffic Class (TC) field (as defined in IETF RFC 5462, by Andersson et al.) The queue status information typically includes the lengths and/or the respective transmission rates of the queues in question, and the probability values depend on a comparison of these lengths to the available buffer allocations 38 of the queues. The packet header fields of relevance include, inter alia, the ECN and differentiated services code point (DSCP) fields in the IP header. Packet classifier 50 may also indicate to packet discard machine 58 and packet marking machine 62 whether a given queue or packet type is eligible for packet dropping, marking, or both.

Congestion control logic 42 also comprises machine control circuitry, including a drop enable circuit 60 and, optionally, an ECN enable circuit 64. Drop enable circuit 60 is coupled to selectively enable and disable the packet discard machine 58, while ECN enable circuit 64 selective enables and disables packet marking machine 64. When drop enable circuit 60 disables packet discard machine 58, for example, congestion control logic 42 will still mark packets in case of congestion but will not drop packets. Thus, by setting circuits 60 and 64, the system operator of switch 20 is able to determine how the switch will respond to congestion: by dropping packets, marking packets, or both or neither of these functions. These settings may change over time, either automatically or under direct operator control, on the basis of network configuration and status, as well as other system requirements.

When enabled by drop enable circuit 60, packet discard machine 58 chooses, based on the probability value from profile calculator 58, the appropriate fraction of packets to drop from each queue. These packets are deleted from memory 36 and from the respective queues in queuing system 52.

By the same token, when enabled by ECN enable circuit 64, packet marking machine 62 chooses, based on the probability value from profile calculator 58, the appropriate packets in each queue to mark with a congestion notification, and instructs packet modifier 54 to modify the packet headers accordingly. The congestion notification may be marked, for example, in the ECN field of the IP header, as explained above, or in another appropriate header field, such as the MPLS TC field. The packets are then transmitted via egress port 22B to network 24.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Communication apparatus, comprising:
multiple interfaces configured to be connected to a packet data network so as to serve as both ingress and egress interfaces in receiving and forwarding of data packets from and to the network by the apparatus;
a memory coupled to the interfaces and configured as a buffer to contain the data packets received through the ingress interfaces in multiple queues while awaiting transmission to the network via the egress interfaces; and
congestion control logic, which comprises:
a packet discard machine, which is configured to drop a first fraction of the data packets from at least a first queue in the buffer in response to a status of the queues;
a packet marking machine, which is configured to apply a congestion notification to a second fraction of the data packets from at least a second queue in the buffer in response to the status of the queues;

machine control circuitry, which is coupled to selectively enable and disable at least the packet discard machine, so that when the packet discard machine is disabled, the data packets are not dropped by the network element despite congestion indicated by the status of the queues; and a profile calculator, which is configured to compute the first and second fractions responsively to respective statuses of the first and second queues.

2. The apparatus according to claim 1, wherein the machine control circuitry is further coupled to selectively enable and disable the packet marking machine.

3. The apparatus according to claim 1, wherein the packet discard machine and the packet marking machine are configured to drop and apply the congestion notification to respective fractions of the data packets in a same one or more of the queues.

4. The apparatus according to claim 1, wherein the congestion notification comprises setting an explicit congestion notification (ECN) field in a header of the data packets.

5. The apparatus according to claim 1, wherein the congestion notification comprises setting a traffic class (TC) field in a header of the data packets.

6. The apparatus according to claim 1, wherein the profile calculator is configured to compute the first and second fractions by comparing lengths of the queues to respective buffer allocations of the queues in the memory.

7. The apparatus according to claim 1, wherein the profile calculator is configured to compute the first and second fractions based on respective transmission rates of the queues.

8. The apparatus according to claim 1, and comprising packet classification logic, which is configured to assign the data packets received through the ingress to the multiple queues, and to convey information regarding the received data packets to the profile calculator.

9. A method for communication, comprising:

in a network element having multiple interfaces connected to a packet data network so as to serve as both ingress and egress interfaces and a memory coupled to the interfaces, placing data packets received through the ingress interfaces in multiple queues in the memory while the data packets await transmission to the network;

applying congestion control to the data packets that are queued for transmission using a packet discard machine, which is configured to drop a first fraction of the data packets from at least a first queue in the buffer in response to a status of the queues, and using a packet marking machine, which is configured to apply a congestion notification to a second fraction of the data packets from at least a second queue in the buffer in response to the status of the queues, wherein applying the congestion control comprises:

computing the first and second fractions responsively to respective statuses of the first and second queues; and selectively enabling and disabling at least the packet discard machine, so that when the packet discard machine is disabled, the data packets are not dropped by the network element despite congestion indicated by the status of the queues.

10. The method according to claim 9, and comprising selectively enabling and disabling the packet marking machine.

11. The method according to claim 9, wherein applying the congestion control comprises dropping and applying the congestion notification to respective fractions of the data packets in a same one or more of the queues.

12. The method according to claim 9, wherein the congestion notification comprises setting an explicit congestion notification (ECN) field in a header of the data packets.

13. The method according to claim 9, wherein the congestion notification comprises setting a traffic class (TC) field in a header of the data packets.

14. The method according to claim 9, wherein computing the first and second fractions comprises comparing lengths of the queues to respective buffer allocations of the queues in the memory.

15. The method according to claim 9, wherein computing the first and second fractions comprises assessing respective transmission rates of the queues.

16. The method according to claim 9, wherein computing the first and second fractions comprises applying information regarding the received data packets in computing the first and second fractions.

\* \* \* \* \*